United States Patent
Dong

(10) Patent No.: US 10,977,350 B2
(45) Date of Patent: Apr. 13, 2021

(54) CONTACT INFORMATION DISPLAY METHOD AND DEVICE, AND INFORMATION DISPLAY METHOD AND DEVICE

(71) Applicant: Alibaba Group Holding Limited, Grand Cayman (KY)

(72) Inventor: Hang Dong, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 241 days.

(21) Appl. No.: 15/914,989

(22) Filed: Mar. 7, 2018

(65) Prior Publication Data
US 2018/0260549 A1 Sep. 13, 2018

(30) Foreign Application Priority Data
Mar. 8, 2017 (CN) .......................... 201710135065.0

(51) Int. Cl.
| G06F 21/32 | (2013.01) |
| G06F 3/048 | (2013.01) |
| G06K 9/00 | (2006.01) |

(52) U.S. Cl.
CPC .............. *G06F 21/32* (2013.01); *G06F 3/048* (2013.01); *G06K 9/00087* (2013.01); *G06K 9/00288* (2013.01); *G06K 9/00617* (2013.01)

(58) Field of Classification Search
CPC ..... G06F 21/32; G06F 3/048; G06K 9/00617; G06K 9/00288; G06K 9/00087; H04M 1/72577; H04M 1/67
See application file for complete search history.

(56) References Cited

U.S. PATENT DOCUMENTS

| 6,798,334 B1* | 9/2004 | Meister | G06K 9/00087 |
| | | | 340/5.52 |
| 7,020,308 B1* | 3/2006 | Shinzaki | G06F 21/32 |
| | | | 382/124 |
| 9,836,814 B2* | 12/2017 | Nakai | G09G 5/003 |
| 2002/0178367 A1* | 11/2002 | Hamid | G06F 21/32 |
| | | | 713/186 |
| 2006/0074986 A1* | 4/2006 | Mallalieu | G07C 9/37 |
| 2014/0366158 A1* | 12/2014 | Han | G06F 21/60 |
| | | | 726/28 |
| 2015/0254467 A1 | 9/2015 | Leuthardt et al. | |

(Continued)

FOREIGN PATENT DOCUMENTS

| CN | 101035335 A | 9/2007 |
| CN | 105631275 A | 6/2016 |

(Continued)

OTHER PUBLICATIONS

PCT Search Report and Written Opinion dated May 8, 2018, for PCT Application No. PCT/US18/21411, 10 pages.

(Continued)

*Primary Examiner* — Khoi V Le
(74) *Attorney, Agent, or Firm* — Lee & Hayes, P.C.

(57) ABSTRACT

An information display method including: detecting a biometric characteristic of a current user of a terminal; determining whether the biometric characteristic matches a preset biometric characteristic; and determining, based on a judgment result, whether to display first information of a designated contact in the terminal.

16 Claims, 10 Drawing Sheets

(56) References Cited

U.S. PATENT DOCUMENTS

| | | | |
|---|---|---|---|
| 2016/0034697 A1 | 2/2016 | Mebed | |
| 2016/0125240 A1* | 5/2016 | Danikhno | G06F 21/32 348/78 |
| 2016/0364600 A1* | 12/2016 | Shah | G06K 9/00087 |
| 2017/0024601 A1* | 1/2017 | Lin | G06K 9/00087 |
| 2018/0039767 A1* | 2/2018 | Qin | G10L 17/02 |

FOREIGN PATENT DOCUMENTS

| | | |
|---|---|---|
| CN | 105843525 A | 8/2016 |
| CN | 106385506 A | 2/2017 |
| WO | WO2016131362 | 8/2016 |
| WO | WO2016165161 | 10/2016 |

OTHER PUBLICATIONS

Machine translation of Chinese Office Action dated Apr. 3, 2020 for Chinese patent application No. 201710135065.0, a counderpart foriegn application of U.S. Appl. No. 15/914,989, 10 pages.

The CN Search Report dated Mar. 6, 2020, for CN Application No. 201710135065.0, 1 page.

\* cited by examiner

CONTACT INFORMATION DISPLAY METHOD AND DEVICE, AND INFORMATION DISPLAY METHOD AND DEVICE

CROSS REFERENCE TO RELATED PATENT APPLICATIONS

This application claims priority to Chinese Patent Application No. 201710135065.0 filed on 8 Mar. 2017 and entitled "CONTACT INFORMATION DISPLAY METHOD AND DEVICE, AND INFORMATION DISPLAY METHOD AND DEVICE", which is incorporated herein by reference in its entirety.

TECHNICAL FIELD

The present disclosure relates to the field of information processing, and, more particularly, to contact information display methods and devices, and information display methods and devices.

BACKGROUND

At present, mobile terminals are mostly equipped with a gesture/digital lock screen function. Unlocking manners generally include sliding fingerprint unlocking, entering a digital password, and so on according to a predetermined track. Such manners may well protect the privacy of users, so that information in the mobile terminals of the users is prevented from being viewed by others.

Although the gesture/digital lock may protect the privacy of the users, an unlocking interface that pops up when an unlocking function is triggered clearly informs a person who unlocks a mobile terminal that the mobile terminal stores privacy information which should be prevented from being known by others. A good protection function against snoopers is achieved. However, displaying of reminders and repeated unlocking may cause poor user experience. No effective solution has been put forward to solve the problems of inconvenience and poor privacy protection effects of an existing terminal caused by repeated unlocking.

SUMMARY OF THE INVENTION

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

According to an aspect of example embodiments of the present disclosure, a contact information display method is provided, which includes: detecting a biometric characteristic of a current user of a terminal; determining whether the biometric characteristic matches a preset biometric characteristic; and determining, based on a judgment result, whether to display first information of a designated contact in the terminal.

According to an aspect of the example embodiments of the present disclosure, a contact information display device is provided, which includes: a detection module configured to detect a biometric characteristic of a current user of a terminal; a judgment module configured to determine whether the biometric characteristic matches a preset biometric characteristic; and a determination module configured to determine, based on a judgment result, whether to display first information of a designated contact in the terminal.

According to another aspect of the example embodiments of the present disclosure, an information display method is further provided, which includes: starting an application (APP) on a terminal; detecting a biometric characteristic of a current user; acquiring an access permission corresponding to the biometric characteristic; and displaying, based on the access permission, content which is displayed by the APP and corresponds to the access permission.

According to another aspect of the example embodiments of the present disclosure, a terminal is further provided, which includes: a processor configured to detect a biometric characteristic of a current user of the terminal, determine whether the biometric characteristic matches a preset biometric characteristic, and determine, based on a judgment result, whether to display first information of a designated contact; and a display device configured to display the first information of the designated contact when the judgment result indicates that the biometric characteristic matches the preset biometric characteristic, or display second information of other contacts except the designated contact in the terminal when the judgment result indicates that the biometric characteristic does not match the preset biometric characteristic.

According to another aspect of the example embodiments of the present disclosure, an information display device is further provided, which includes: a starting module configured to start an APP on a terminal; a detection module configured to detect a biometric characteristic of a current user; an acquisition module configured to acquire an access permission corresponding to the biometric characteristic; and a display module configured to display, based on the access permission, content which is displayed by the APP and corresponds to the access permission.

For a designated contact, a judgment on a user of a current terminal is made by using a biometric recognition technology of the terminal, such as face recognition, fingerprint recognition or iris recognition. Because biometric recognition is unique, accurate and fast, the terminal may accurately determine whether the current terminal user is a preset user having a preset biometric characteristic, and further determine whether to display related information of the designated contact. Thus, the techniques of the present disclosure intelligently determine, through the biometric recognition, whether to display SMS messages and phone calls of the designated contact, thereby meeting the needs of unaware snoop prevention and convenience. In this way, privacy of the terminal user may be guaranteed to prevent privacy information of the user from being snooped by others, and further use convenience for the user may be improved, thereby avoiding unnecessary repeated unlocking.

Thus, the foregoing solution solves the technical problems of inconvenience and poor privacy protection effects of an existing terminal caused by repeated unlocking.

BRIEF DESCRIPTION OF THE DRAWINGS

The accompanying drawings described herein are used to provide further understanding of the present disclosure, and constitute a part of the present disclosure. Schematic example embodiments of the present disclosure and descriptions of the schematic example embodiments are used to explain the present disclosure, but are not to be interpreted as limiting the present disclosure. In the drawings.

DETAILED DESCRIPTION

Figure 1:
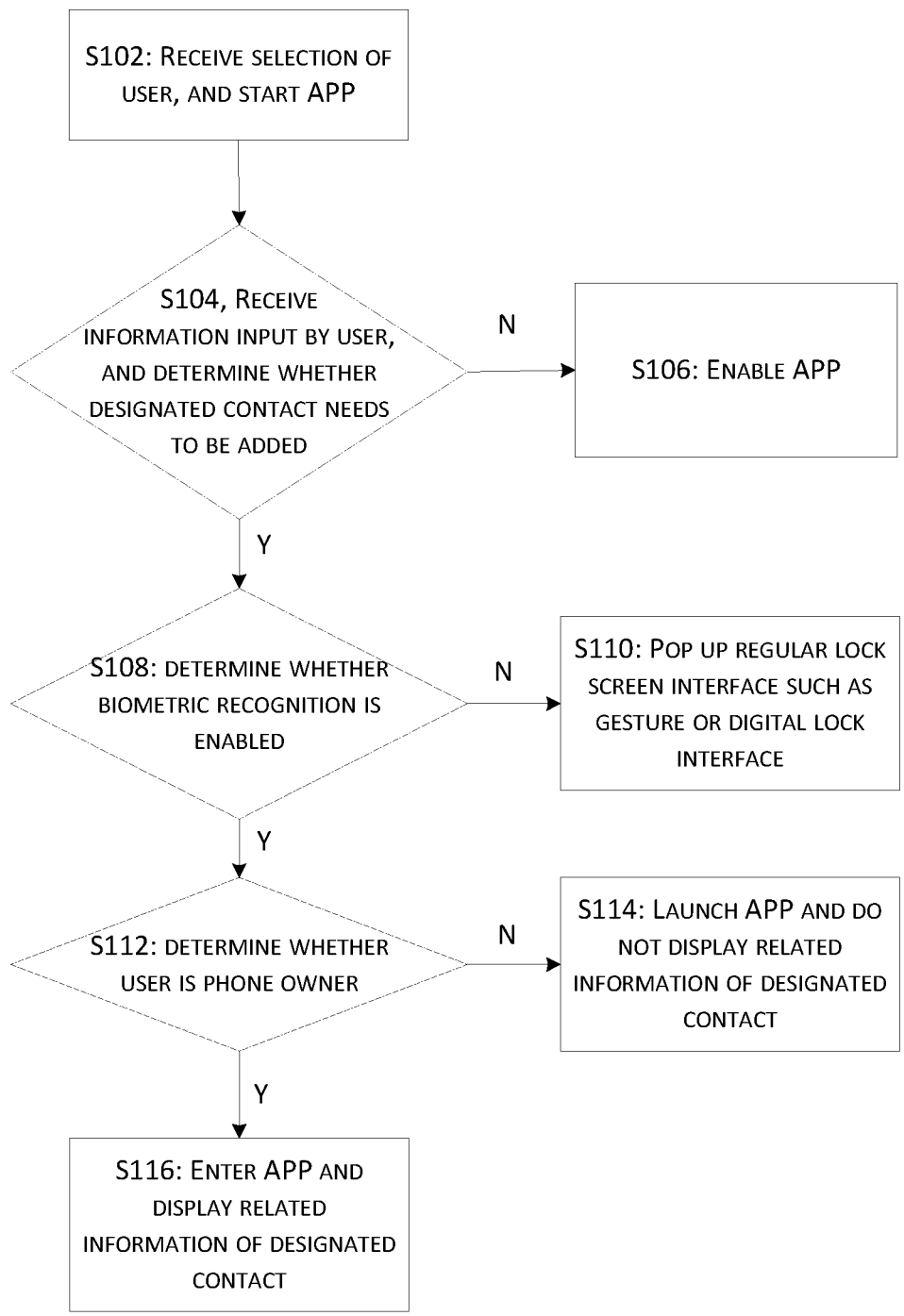
FIG. 1 is a flowchart of an optional contact information display method according to an example embodiment of the present disclosure.

To enable persons skilled in the art to better understand the solutions of the present disclosure, the technical solution in the example embodiments of the present disclosure will be clearly and completely described below with reference to the accompanying drawings in the example embodiments of the present disclosure. It is apparent that the example embodiments to be described represent only a part of rather than all of the example embodiments of the present disclosure. All other example embodiments derived by persons of ordinary skill in the art based on the example embodiments in the present disclosure without making creative efforts should fall in the scope of the present disclosure.

It should be noted that, the terms "first", "second", and so on in the specification, claims and the drawings of the present disclosure are used to distinguish similar objects, but not necessarily to describe a particular order or sequence. It should be understood that, data used as such may be interchanged under appropriate circumstances, so that the example embodiments of the present disclosure described herein could be implemented in an order other than the order illustrated or described herein. In addition, the terms "comprise/include" and "have" as well as their any variations are intended to cover non-exclusive inclusion. For example, a process, method, system, product or device including a series of steps or units are not necessarily limited to the steps or units clearly listed, but may include other steps or units not clearly listed or inherent to the process, method, system, product or device.

To facilitate understanding of the example embodiments of the present disclosure, technical terms involved in the example embodiments of the present disclosure are explained as follows:

Biometric recognition: each individual has a unique physiological characteristic or behavioral pattern that may be measured or automatically recognized and verified, that is, a biometric characteristic (e.g. a fingerprint, facial image, iris, palm print, or the like). Biometric recognition is the use of human physiological or behavioral characteristics to verify personal identity.

Information disguise: real information is disguised as other information that is irrelevant to the real information.

Designated contact: a designated contact is a contact having a particular attribute in an address book (including, but not limited to, a phone book, an address book in instant messaging software, etc.) of a terminal. For example, designated contacts have the following particular attribute: specific information or all information associated with the contacts may be displayed on a terminal where the designated contacts are located only when a certain condition is met (for example, a biometric characteristic of a user of the terminal where the designated contacts are located meets a preset condition). It should be noted that the particular attribute may be a user-defined attribute.

Example Embodiment 1

To prevent information of a mobile phone from being viewed by others at will, a commonly taken approach is to lock the screen of the mobile phone. When a user triggers a lock screen key of a mobile terminal or if a mobile terminal does not receive any new instruction in a preset time period, the mobile terminal enters a lock screen state. The user needs to perform an unlocking operation, such as sliding, entering a password or the like, to use the mobile terminal that has entered the lock screen state. In addition, a locking function of an APP may also provide similar protection for information. Such a method may indeed protect information in a mobile terminal from being viewed at will. However, a user needs to unlock the mobile terminal every once in a while to use it again, which is very inconvenient.

To solve the foregoing technical problem, the present disclosure provides a corresponding solution. Description is provided below by using an example in which the terminal is a mobile phone and the APP (Application) is an SMS or phone APP, as shown in FIG. 1:

Step S102. A selection of a user is received, and an APP is started.

In the step, for example, a current user clicks on an APP icon, and an APP of a terminal may be started.

Step S104. Information input by the user is received, and it is determined whether a designated contact needs to be added. If a phone owner wants to add the designated contact, step S108 is performed; otherwise, step S106 is performed.

The designated contact that the phone owner adds through the above step may be a contact that the phone owner needs to hide from others.

Optionally, the user may select a contact in an address book as the designated contact to be added, or the user may manually input a phone number, a name, a nickname, a WECHAT ID, a QQ number or other special identification information of the designated contact to add the designated contact. For example, if the user adds Wang XX in a mobile phone address book as the designated contact, APPs such as WECHAT, QQ, and ALIPAY that match the address book all may use Wang XX as the designated contact. Even if Wang XX has different nicknames in multiple APPs, the APPs may still identify Wang XX and use Wang XX as the designated contact based on a matching function between the APPs.

Step S106. The APP is enabled.

The SMS or phone APP is enabled in the case where the phone owner does not add any designated contact.

Step S108. Whether biometric recognition is enabled is determined. If the phone owner has enabled the biometric recognition, step S112 is performed; otherwise, step S110 is performed.

Optionally, the biometric recognition may be a facelock. The facelock is used for determining whether to display information of the designated contact by identifying facial feature information of the current terminal user. In the step, it is determined whether biometric recognition is enabled when the phone owner determines to add the designated contact.

For example, the phone owner disables the biometric recognition for a game APP and a video entertainment APP of the mobile phone that do not have information related to the designated contact, but enables the biometric recognition for SMS, phone and WECHAT APPs that have or have a chance to receive the information related to the designated contact.

Step S110. A regular lock screen interface such as a gesture or digital lock interface pops up.

In this step, a regular unlocking interface may be enabled when the user does not enable the biometric recognition, so that information stored in the mobile phone is protected in the event that the user does not enable the biometric recognition.

Step S112. Whether the user is the valid user such as a phone owner is determined.

For example, the biometric recognition is a facelock. When the user enables a preset APP in the event that the phone owner enables the facelock, the mobile phone may detect a facial image of a current user by using a front camera and extract a feature of the facial image, to take the acquired facial feature of the current terminal user as the biometric characteristic of the current user. It may be determined whether the current terminal user is the phone owner by matching the facial feature of the current terminal user with a pre-stored facial feature of the phone owner. In this step, a judgment result at least includes either of the following: matching and mismatching. If the facial feature of the current terminal user matches a preset facial image, it may be determined that the current terminal user is the phone owner, and step S116 is performed. If the facial feature of the current terminal user does not match the preset facial image, it may be determined that the current terminal user is not the phone owner, and step S114 is performed.

Step S114. The APP is launched or started and related information of the designated contact is not displayed.

When the current terminal user is not the phone owner, the mobile phone hides and/or disguises the related information of the designated contact, and launches the SMS or phone APP, without displaying the related information of the designated contact.

Step S116. The APP is launched and the related information of the designated contact is displayed.

When the current terminal user is the phone owner, the mobile phone does not hide the related information of the designated contact, and undisguises the information of the designated contact, to restore the information of the designated contact to user identifiable information. After the user launches the SMS or phone APP, the terminal will display all information, including the information of the designated contact.

Figure 2:
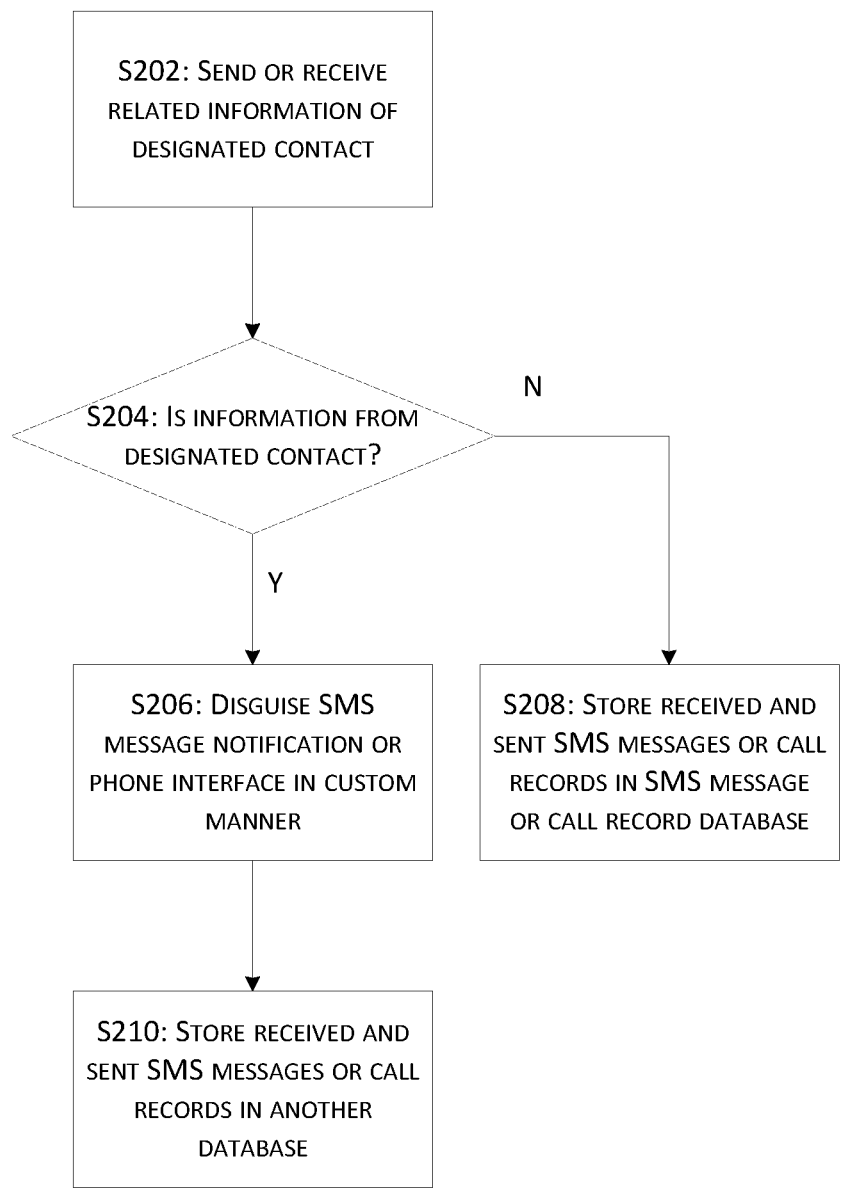
FIG. 2 is a flowchart of an optional information display method when a judgment result indicates a mismatch according to an example embodiment of the present disclosure.

FIG. 2 is a flowchart of an optional information display method when a judgment result indicates a mismatch according to an example embodiment of the present disclosure. To further describe the foregoing implementation solution, detailed description is provided below with reference to FIG. 2 by using an example in which the terminal is a mobile phone. In this example embodiment, when the result of the judgment on detected characteristic information of the current terminal user indicates a mismatch, the method includes the following steps:

S202. Information related to a designated contact is received or sent.

The information may be an SMS message or a call record, and may also be WECHAT, ALIPAY and other communication records, which is not for example limited here.

S204. It is determined whether the information is from the designated contact.

This step is used for determining whether an SMS message or phone call currently received or sent is from the designated contact. The designated contact is set by the phone owner. If the SMS message or phone call currently received or sent is related to the designated contact, step S206 is performed; otherwise, step S208 is performed.

S206. An SMS message notification or phone interface is disguised in a custom manner.

If the SMS message or phone call currently received or sent is related to the designated contact, an SMS message notification or phone interface is disguised in accordance with a preset or default form, so that the information related to the designated contact cannot be identified by the current terminal user. In an optional example embodiment, for example, first information of the designated contact is an SMS message from the designated contact. In the case where the judgment result indicates a mismatch and the current terminal user is determined not the valid user such as the phone owner. If the terminal receives an SMS message from the designated contact, content of the SMS message from the designated contact is disguised, so that the non-owner user cannot identify the SMS message or phone call from the designated contact. For example, the SMS message from the designated contact may be disguised as a phone bill reminder message or the like sent by a communication corporation.

S208. SMS messages or call records received and sent are stored in an SMS message/call record database.

The SMS messages or call records related to the designated contact may be put in a first SMS message/call record database. The first SMS message or call record database is different from a second SMS message/call record database in which information of other contacts except the designated contact is stored.

S210. The SMS messages or call records received and sent are stored in another database, where the another database is the second SMS message/call record database.

Based on the forgoing solution provided in the present disclosure, for a designated contact, a judgment on a user of a current terminal is made by using a biometric recognition technology of the terminal, such as face recognition, fingerprint recognition or iris recognition. Because biometric recognition is unique, accurate and fast, the terminal may accurately determine whether the current terminal user is a preset user having a preset biometric characteristic, and further determine whether to display related information of the designated contact. Thus, it may be intelligently determined, through the biometric recognition, whether to display SMS messages and phone calls of the designated contact, meeting the needs of unaware snoop prevention and convenience. In this way, privacy of the terminal may be guaranteed to prevent privacy information of the user from being snooped by others, and further use convenience for the user may be improved, thereby avoiding unnecessary repeated unlocking.

Example Embodiment 2

Figure 3:
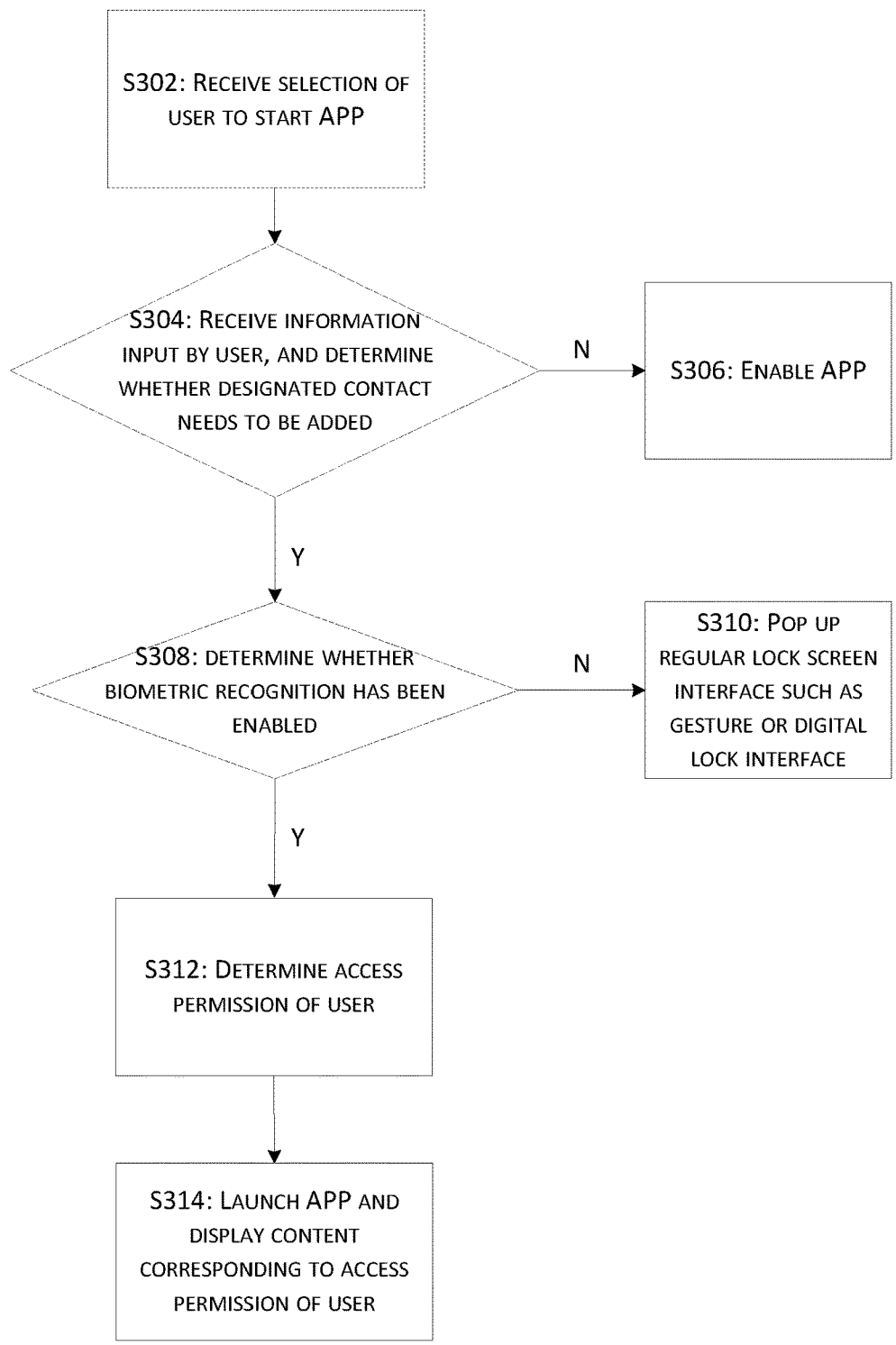
FIG. 3 is a flowchart of an optional information display method according to an example embodiment of the present disclosure.

In order to solve the technical problems of inconvenience and poor privacy protection effects of an existing terminal caused by repeated unlocking, the present disclosure further proposes the following solution. In the following, description is provided by using an example in which the terminal is a mobile phone and the APP is an SMS or phone APP, as shown in FIG. 3:

Step S302. A selection of a user is received to start an APP (Application).

In this step, for example, a current user clicks on an APP icon, and an APP of a terminal is started.

Step S304. Information input by the user is received, and whether a designated contact needs to be added is determined.

If a phone owner adds a designated contact through this step, the added contact is the designated contact, which may be a contact that the phone owner needs to hide from others. If the phone owner intends to add a designated contact, step S308 is performed; otherwise, step S306 is performed.

Step S306. The APP is enabled.

The SMS or phone APP is enabled in the case where the phone owner does not add any designated contact.

Step S308. Whether biometric recognition is enabled is determined. If the phone owner has enabled the biometric recognition, step S312 is performed; otherwise, step S310 is performed.

Optionally, the biometric recognition may be a facelock. The facelock is used for determining whether to display information of the designated contact by identifying facial feature information of the current terminal user. In this step, it is determined whether biometric recognition is enabled if the phone owner determines to add the designated contact. For example, the phone owner disables the biometric recognition for a game APP and a video entertainment APP of the mobile phone that do not have information related to the designated contact, but enables the biometric recognition for SMS, phone and WECHAT APPs that have or have a chance to receive the information related to the designated contact.

Step S310. A regular lock screen interface such as a gesture or digital lock interface pops up.

In this step, a gesture or digital lock interface pops up if the user does not enable the biometric recognition.

Step S312. An access permission of the user is determined.

It should be noted herein that, one or more biometric characteristics and one or more access permissions corresponding to the one or more biometric characteristics may be input to the terminal before an access permission of the user is determined. Therefore, after being detected, the biometric characteristic of the current user may be matched with the pre-stored biometric characteristics, so that an access permission corresponding to a biometric characteristic matching the current user is assigned to the current user.

In an optional example embodiment, a mobile phone has three access permissions: A, B and C. Access permission A allows access to all content of the mobile phone, and the corresponding biometric characteristic is a biometric characteristic of the phone owner. Access permission B allows access to related content of other contacts except designated contact X, and the corresponding biometric characteristic is a biometric characteristic of a family member of the phone owner. Access permission C allows access to related content of other contacts except designated contacts X and Y, and the corresponding biometric characteristic is another biometric characteristic that does not match the pre-stored biometric characteristics.

S314. The APP is launched or started and content corresponding to the access permission of the user is displayed.

In the foregoing example embodiment, if it is detected that the biometric characteristic of the current terminal user matches the biometric characteristic corresponding to access permission A, all information in the APP is displayed to the current user. If it is detected that the biometric characteristic of the current terminal user matches the biometric characteristic corresponding to access permission B, related content of other contacts except contact X in the APP is displayed to the current user. If it is detected that the biometric characteristic of the current terminal user does not match any of the pre-stored biometric characteristics, related content of other contacts except contacts X and Y is displayed to the current user.

It should be noted herein that, during message receiving and transmission with contacts, content related to contacts X and Y and content related to other contacts except contacts X and Y may be stored in different databases respectively, so that corresponding display content is invoked from a corresponding database according to an access permission after the access permission of the current user is determined.

In the foregoing embodiments, an access permission of the current terminal user on the terminal may be determined by using a face recognition device, a fingerprint recognition device, an iris recognition device, or other biometric recognition devices of the terminal. Because biometric recognition is unique, accurate and fast, the terminal may accurately compare a biometric characteristic of the current terminal user with a pre-stored biometric characteristic, to determine an access permission corresponding to the biometric characteristic of the current terminal user, and then display corresponding content according to the access permission of the current terminal user. Thus, it may be intelligently determined, through the biometric recognition, whether to display SMS messages and phone calls of the designated contact, meeting the needs of unaware snoop prevention and convenience. In this way, privacy of the terminal may be guaranteed to prevent privacy information of the user from being snooped by others, and further use convenience for the user may be improved, thereby avoiding unnecessary repeated unlocking.

Thus, the foregoing solution solves the technical problems of inconvenience and poor privacy protection effects of an existing terminal caused by repeated unlocking.

Example Embodiment 3

According to the example embodiments of the present disclosure, an example embodiment of a contact information display method is further provided. It should be noted that, steps illustrated in the flowchart of the drawings may be performed in a computer system such as a set of computer executable instructions. In addition, although a logic order is shown in the flowchart, under some circumstances, the steps illustrated or described may be performed in an order different from the logic order herein.

Figure 4:
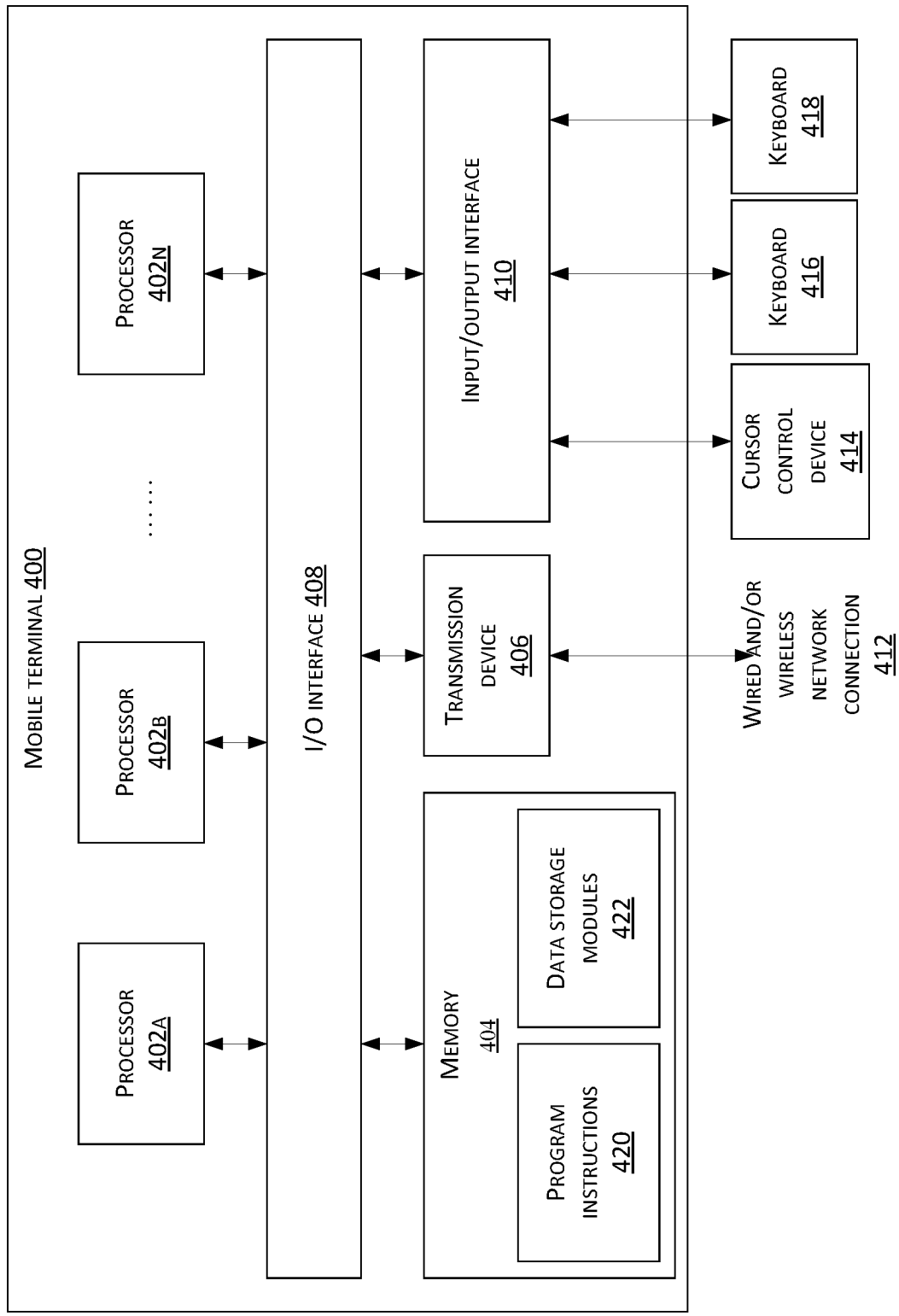
FIG. 4 is a structural diagram of hardware of mobile equipment configured to implement a contact information display method according to an example embodiment of the present disclosure.

The method example embodiment provided in Example embodiment 1 of the present disclosure may be performed in a mobile terminal, a computer terminal or a similar arithmetic device. FIG. 4 is a structural block diagram of hardware of mobile equipment configured to implement a contact information display method. As shown in FIG. 4, the mobile terminal 400 may include one or more (illustrated in the figure with 402a, 402b, 402n) processors 402 (the processors 402 may include, but not limited to, processing units such as a microprocessor MCU or a programmable logic device FPGA), a memory 404 configured to store data, and a transmission device 406 configured to implement a communications function. In addition, the mobile equipment may further include: a display (not shown in FIG. 4), an input/output interface (I/O interface) 408, a universal serial bus (USB) port (which may be included as one of the ports in the I/O interface and is not shown in FIG. 4), an input and output interface 410, a network interface (not shown in FIG. 4), a power supply (not shown in FIG. 4) and/or a camera (not shown in FIG. 4). Persons of ordinary skill in the art may understand that the structure shown in FIG. 4 is only for the purpose of illustration, which does not pose any limitation to the structure of the electronic device. For example, the mobile terminal 400 may also include more or fewer components than those shown in FIG. 4, or have a configuration different from that shown in FIG. 4.

It should be noted that, the one or more processors 402 and/or other data processing circuits may be generally referred to as a "data processing circuit" in this text. The data processing circuit may be wholly or partially embodied as software, hardware, firmware or any other combinations. In addition, the data processing circuit may be a single independent processing module, or wholly or partially combined into any of other elements in the mobile terminal. As involved in the example embodiment of the present disclosure, the data processing circuit is used as a processor to perform a control (for example, the selection of a variable-resistor terminal path connected to an interface).

The memory 404 may be configured to store software programs and modules of APP software, for example, program instructions or data storage devices corresponding to the contact information display method in the example embodiment of the present disclosure. The processor 402 may run the software programs and modules stored in the memory 404, to implement various functional applications and data processing, that is, implement the contact information display method. The memory 404 may include a high-speed random access memory, and may also include a nonvolatile memory, for example, one or more magnetic storage devices, flash memories or other nonvolatile solid-state memories. In some instances, the memory 404 may further include memories remotely disposed relative to the processor 402, and these remote memories may be connected to the mobile terminal 400 via a network. Instances of the network include, but are not limited to, the Internet, an intranet, a local area network, a mobile communications network, or their combinations.

The memory 404 is an example of computer readable media.

Computer readable media, including both permanent and non-permanent, removable and non-removable media, may be stored by any method or technology for storage of information. The information can be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read only memory Such as ROM, EEPROM, flash memory or other memory technology, CD-ROM, DVD, or other optical storage, Magnetic cassettes, magnetic tape magnetic tape storage or other magnetic storage devices, or any other non-transitory medium, may be used to store information that may be accessed by a computing device. As defined herein, computer-readable media do not include non-transitory transitory media such as modulated data signals and carriers.

The transmission device 406 is configured to receive or send data via a network. The network may for example include a wireless network provided by a communications provider of the mobile terminal 400. In an instance, the transmission device 406 includes a Network Interface Controller (NIC), which may connect to other network devices via a base station to communicate with the Internet. In an instance, the transmission device 406 may be a Radio Frequency (RF) module configured to communicate with the Internet wirelessly. The transmission device 406 is associated with wired and/or wireless network connection 412.

The input and output interface 410 may be connected with a cursor control device 414 such as a mouse, a first keyboard 416 and a second keyboard 418.

The memory 404 may stored therein a plurality of computer readable instructions or program instructions 420 and data storage modules 422.

The display may be, for example, a touch-screen liquid crystal display (LCD). The LCD may enable users to interact with a user interface of the mobile equipment.

Figure 5:
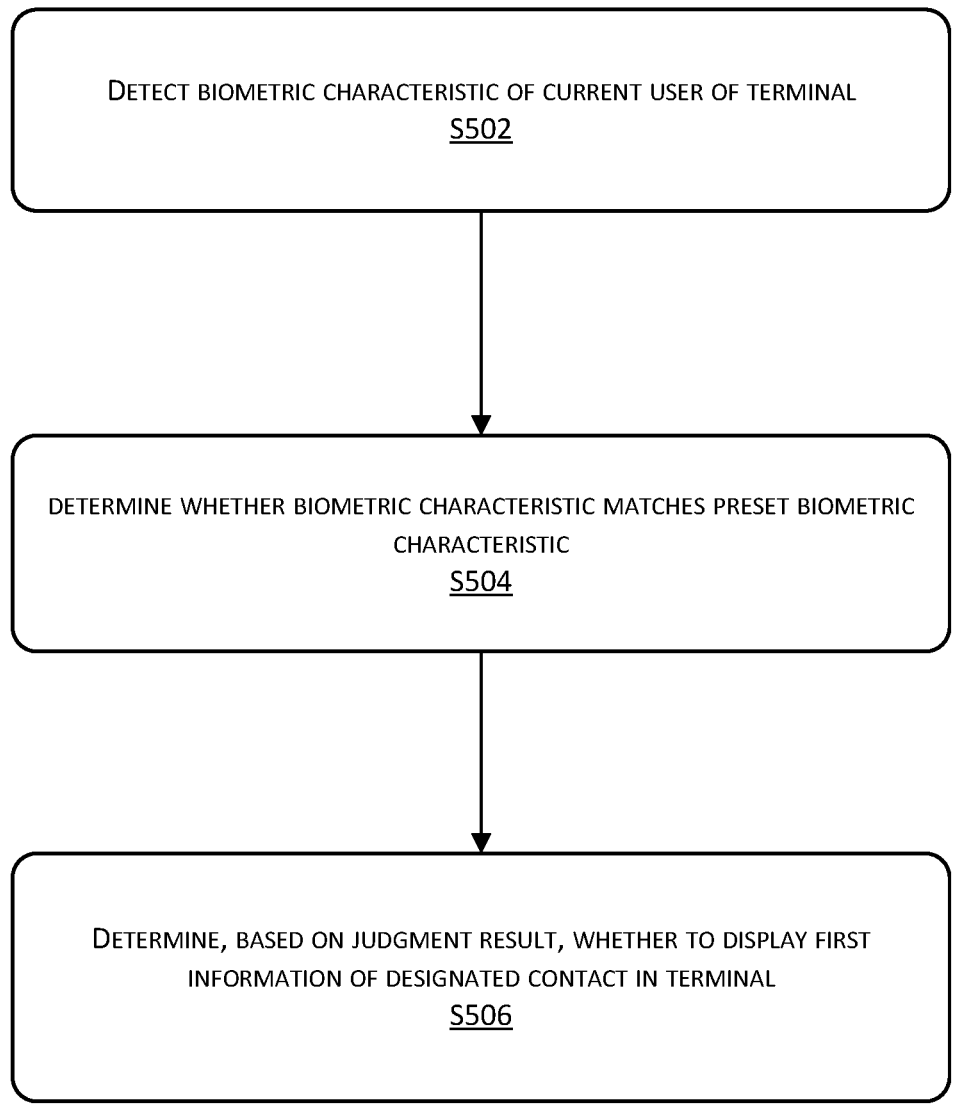
FIG. 5 is a flowchart of a contact information display method according to an example embodiment of the present disclosure.

It should be noted herein that, in some optional example embodiments, the mobile equipment shown in FIG. 4 may include hardware elements (including circuits), software elements (including computer code stored in a computer readable medium), or a combination of the hardware elements and the software elements. It should be pointed out that FIG. 4 is merely an instance of a specific example embodiment, and is intended to illustrate the types of members that may be stored in the mobile equipment. In the foregoing running environment, to solve the problem that it is inconvenient to use the mobile equipment as the user needs to unlock the mobile equipment each time using it, the present disclosure provides a contact information display method as shown in FIG. 5. FIG. 5 is a flowchart of a contact information display method according to Example embodiment 1 of the present disclosure. The contact information display method includes the following steps:

Step S502. A biometric characteristic of a current terminal user is detected.

For example, the biometric characteristic may be an iris characteristic, a facial characteristic, a fingerprint characteristic or the like. The biometric characteristic of the current terminal user may be detected by using a variety of devices on a mobile terminal. For example, if the current terminal is a mobile phone, a device for detecting the biometric characteristic of the current terminal user may be a camera of the mobile phone, a fingerprint detection device of the mobile phone, or the like.

Step S504. Whether the biometric characteristic matches a preset biometric characteristic is determined.

In this step, in consideration of an environmental influence on the detection, it may be determined that the biometric characteristic of the current terminal user matches the preset biometric characteristic if a degree of similarity between the biometric characteristic of the current terminal user and the preset biometric characteristic reaches a preset threshold. This step is mainly used for determining whether the current terminal user is a preset user by matching biometric characteristics, where the preset user is a user having the highest permission to use the current terminal.

Step S506. Based on a determined result, whether to display first information of a designated contact in the terminal is determined.

For example, the first information of the designated contact may be an information record or call record between a preset user and the designated contact, and may also be information such as an image including the designated contact.

It should be noted herein that, in the foregoing solution, for a designated contact, a judgment on a user of a current terminal is made by using a biometric recognition device of the terminal, such as a face recognition device, a fingerprint recognition device or an iris recognition device. Because biometric recognition is unique, accurate and fast, the terminal may accurately determine whether the current terminal user is a preset user having a preset biometric characteristic, and further determine whether to display related information of the designated contact. Thus, it may be intelligently determined, through the biometric recognition, whether to display SMS messages and phone calls of the designated contact, meeting the needs of unaware snoop prevention and convenience. In this way, privacy of the terminal may be guaranteed to prevent privacy information of the user from being snooped by others, and further use convenience for the user may be improved, thereby avoiding unnecessary repeated unlocking.

Thus, the foregoing solution solves the technical problems of inconvenience and poor privacy protection effects of an existing terminal caused by repeated unlocking.

In the foregoing example embodiment of the present disclosure, step S506 of determining, based on a judgment result, whether to display first information of a designated contact in the terminal includes the following steps:

Step A. The first information of the designated contact is displayed when the determined result indicates that the biometric characteristic matches the preset biometric characteristic.

In this step, the first information of the designated contact is displayed if the judgment result indicates that the biometric characteristic of the current terminal user matches the preset biometric characteristic. In an optional example embodiment, still by taking the terminal being a mobile phone as an example, the mobile phone may display all information stored in the mobile phone if the judgment result indicates that the biometric characteristic matches the preset biometric characteristic. The all information definitely includes the first information of the designated contact in the mobile phone. In other words, in this example, the terminal does not hide the first information of the designated contact if the judgment result indicates that the biometric characteristic matches the preset biometric characteristic.

Step B. Second information of other contacts except the designated contact in the terminal is displayed when the determined result indicates that the biometric characteristic does not match the preset biometric characteristic.

In this step, the first information of the designated contact is hidden when the biometric characteristic of the current terminal user does not match the preset biometric characteristic. In an optional example embodiment, still by taking the terminal being a mobile phone as an example, the mobile phone may display second information of other contacts except the first contact when the judgment result indicates that the biometric characteristic does not match the preset biometric characteristic. In other words, in this example, the terminal hides the first information of the contact if the judgment result indicates that the biometric characteristic does not match the preset biometric characteristic.

In the foregoing example embodiment of the present disclosure, step A of displaying the first information of the designated contact when the judgment result indicates that the biometric characteristic matches the preset biometric characteristic includes the following step:

The first information of the designated contact is invoked from a first database when the judgment result indicates that the biometric characteristic matches the preset biometric characteristic, wherein the first database is different from a second database used for storing the second information of the other contacts.

In an optional example embodiment, the first information of the designated contact is stored in a first database, and second information of other contacts except the designated contact is stored in a second database. The terminal invokes the first information of the designated contact from the first database if the judgment result indicates that the biometric characteristic matches the preset biometric characteristic. Moreover, the terminal may also invoke the second information from the second database.

In the foregoing example embodiment of the present disclosure, step A may be implemented in, but not limited to, the following manner: The first information is undisguised to obtain content identifiable to the terminal user; and the identifiable content is displayed.

If the judgment result indicates that the biometric characteristic matches the preset biometric characteristic, and an SMS message is received from the designated contact in the event that the current terminal user is the phone owner, the SMS message from the designated contact is undisguised and displayed in the form of an original SMS message that may be read by the phone owner.

It may be known from the above that, the first information may be undisguised when the judgment result indicates that the biometric characteristic matches the preset biometric characteristic, so that the phone owner may identify the first information related to the designated contact.

In the foregoing example embodiment of the present disclosure, the first information is acquired in the following manner: receiving third information of a current contact; determining whether the third information is related to the designated contact, and taking the third information as the first information of the designated contact when the third information is related to the designated contact.

In the foregoing solution, after new information is received, the received information is first classified based on whether the information is related to the designated contact, and then is stored according to the classification result. If related to the designated contact, the received information is determined as the first information and may be stored in the first database. If not related to the designated contact, the received information is stored in the second database.

In an optional example embodiment, the terminal being a mobile phone is still taken as an example, and the designated contact is A. In the event that the mobile phone receives a new SMS message, the SMS message is taken as the first information and stored in the first database if a source number of the SMS message is the number of the contact A or content of the SMS message includes the name of designated contact A. If irrelevant to the designated contact A, the SMS message is taken as second information and stored in the second database.

In the foregoing example embodiment of the present disclosure, whether the third information is related to the designated contact is determined in one of the following manners: determining whether the third information includes identification information of the designated contact; and determining whether the current contact is identical with the designated contact.

For example, the identification information may be a name, a code name, or the like, and it may be determined whether the current contact is identical with the designated contact based on an information source (e.g., a phone number, a WECHAT ID, a QQ number, or the like).

In the foregoing example embodiment of the present disclosure, the first information is information displayed by an APP currently running in the terminal.

In an optional example embodiment, still by taking the terminal being a mobile phone as an example, if APPs currently running in the terminal include WECHAT, SMS, call, and ALIPAY, the first information is information related to the designated contact in the WECHAT, SMS, call, and ALIPAY APPs.

Before the biometric characteristic of the current terminal user is detected, the method further includes: starting the APP of the terminal.

Optionally, the APP may be all APPs in the terminal, and may also be a designated APP. For example, if the user needs to protect information only about contact A in ALIPAY, the user makes corresponding setting in the ALIPAY APP. If the ALIPAY APP in the mobile phone is not running when the mobile phone is triggered, detection on the biometric characteristic of the current terminal user is not enabled. If the ALIPAY APP in the mobile phone is running on a current interface or is running in the background, the mobile phone starts the step of detecting the biometric characteristic of the current terminal user, to protect the information about contact A in ALIPAY.

It should be noted that, for ease of description, the foregoing method example embodiments are all described as a series of action combinations. However, persons skilled in the art should understand that the present disclosure is not limited to the described sequence of the actions, because some steps may be performed in another sequence or at the same time according to the present disclosure. In addition, persons skilled in the art should also understand that the example embodiments described in this specification are all example embodiments, and the involved actions and modules are not necessarily required by the present disclosure.

Based on the foregoing description of the implementations, persons skilled in the art may clearly understand that the methods according to the foregoing example embodiments may be implemented by software plus a necessary universal hardware platform, and certainly may also be implemented by hardware, but the former is a better implementation in most situations. Based on such understanding, the technical solution of the present disclosure essentially, or the portion contributing to the prior art may be embodied in the form of a software product. The computer software product may be stored in a storage medium (such as a Read-Only Memory (ROM)/Random Access Memory (RAM), a magnetic disk, or an optical disc), and include several instructions to enable terminal equipment (which may be a mobile phone, a computer, a server, a network device, or the like) to execute the methods in the example embodiments of the present disclosure.

Example Embodiment 4

Figure 6:
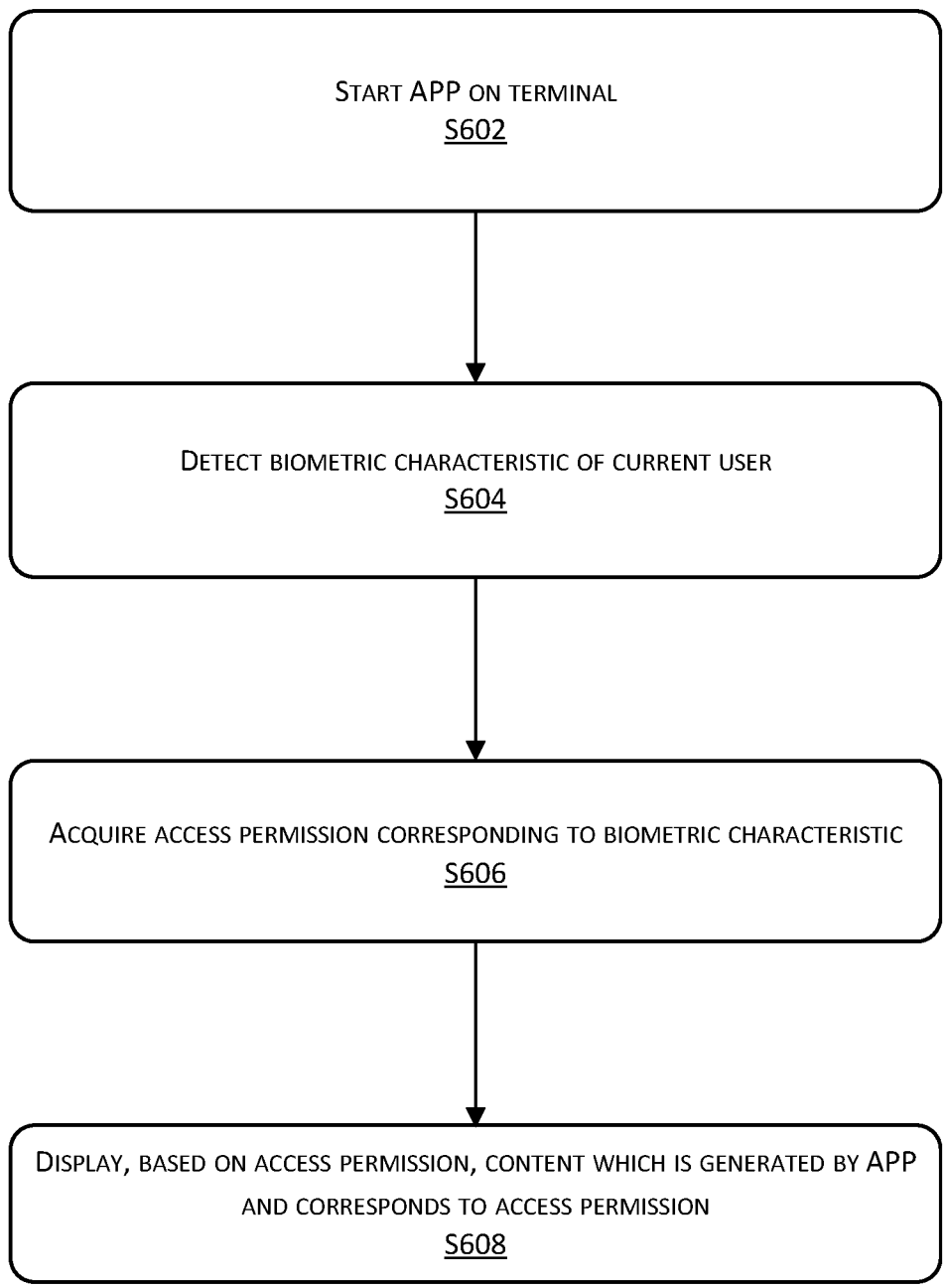
FIG. 6 is a flowchart of an information display method according to an example embodiment of the present disclosure.

In the foregoing running environment, to solve the problem that it is inconvenient to use a mobile terminal as a user needs to unlock the mobile terminal each time using it, the present disclosure provides an information display method as shown in FIG. 6. FIG. 6 is a flowchart of an information display method according to Example embodiment 1 of the present disclosure. The information display method includes the following steps:

Step S602. An APP on a terminal is started.

Step S604. A biometric characteristic of a current user is detected.

For example, the biometric characteristic may be an iris characteristic, a facial characteristic, a fingerprint characteristic, or the like. The biometric characteristic of the current terminal user may be detected by using a variety of devices on a mobile terminal. By taking the current terminal being a mobile phone as an example, the device for detecting the biometric characteristic of the current terminal user may be a camera of the mobile phone, a fingerprint detection device of the mobile phone, or the like.

In an optional example embodiment, by taking the current terminal being a mobile phone as an example, when the user starts the APP on the terminal, the mobile phone may detect a facial image of the current user by using a front camera and extract a characteristic of the facial image, to use the acquired facial characteristic of the current terminal user as the biometric characteristic of the current user. In another optional example embodiment, still by taking the current terminal being a mobile phone as an example, if the user unlocks the mobile phone in a dormant state by using a fingerprint, the mobile phone may detect fingerprint information of the current user and extract a fingerprint characteristic of the current user as the biometric characteristic of the current user.

Step S606. An access permission corresponding to the biometric characteristic is acquired.

Step S608. Content which is generated by the APP and corresponds to the access permission is displayed according to the access permission.

It should be noted herein that, in the foregoing solution, for a designated contact, a judgment on a user of a current terminal is made by using a biometric recognition device of the terminal, such as a face recognition device, a fingerprint recognition device or an iris recognition device. Because biometric recognition is unique, accurate and fast, the terminal may accurately compare a biometric characteristic of the current terminal user with a pre-stored biometric characteristic, to determine an access permission corresponding to the biometric characteristic of the current terminal user, and then display corresponding content according to the access permission of the current terminal user. Thus, it may be intelligently determined, through the biometric recognition, whether to display SMS messages and phone calls of the designated contact, meeting the needs of unaware snoop prevention and convenience. In this way, privacy of the terminal may be guaranteed to prevent privacy information of the user from being snooped by others, and further use convenience for the user may be improved, thereby avoiding unnecessary repeated unlocking.

Thus, the foregoing solution solves the technical problems of inconvenience and poor privacy protection effects of an existing terminal caused by repeated unlocking.

It should be noted that, for ease of description, the foregoing method example embodiments are all described as a series of action combinations. However, persons skilled in the art should understand that the present disclosure is not limited to the described sequence of the actions, because some steps may be performed in another sequence or at the same time according to the present disclosure. In addition, persons skilled in the art should also understand that the example embodiments described in this specification are all example embodiments, and the involved actions and modules are not necessarily required by the present disclosure.

Based on the foregoing descriptions of the implementation manners, persons skilled in the art may clearly understand that the methods according to the foregoing example embodiments may be implemented by software plus a necessary universal hardware platform, and certainly may also be implemented by hardware, but the former is a better implementation in most situations. Based on such understanding, the technical solution of the present disclosure essentially, or the portion contributing to the prior art may be embodied in the form of a software product. The computer software product may be stored in a storage medium (such as a ROM/RAM, a magnetic disk, or an optical disc), and include several instructions that enable terminal equipment (which may be a mobile phone, a computer, a server, a network device, or the like) to execute the methods in the example embodiments of the present disclosure.

Example Embodiment 5

Figure 7:
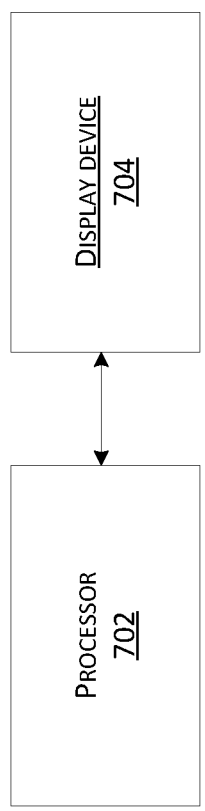
FIG. 7 is a schematic structural diagram of a terminal according to an example embodiment of the present disclosure.

To solve the problem that it is inconvenient to use a mobile terminal as a user needs to unlock the mobile terminal each time using it, the present disclosure provides a terminal as shown in FIG. 7. FIG. 7 is a schematic structural diagram of a terminal according to an example embodiment of the present disclosure. The terminal includes a processor 702 and a display device 704:

The processor 702 is configured to detect a biometric characteristic of a current user of the terminal; determine whether the biometric characteristic matches a preset biometric characteristic; and determine, based on a judgment result, whether to display first information of a designated contact in the terminal.

For example, the biometric characteristic may be an iris characteristic, a facial characteristic, a fingerprint characteristic, or the like. The biometric characteristic of the current terminal user may be detected by using a variety of devices on a mobile terminal. By taking the current terminal being a mobile phone as an example, a device for detecting the biometric characteristic of the current terminal user may be a camera of the mobile phone, a fingerprint detection device of the mobile phone, or the like. The first information of the designated contact may be an information record or call record between a preset user and the designated contact, and may also be information such as an image including the designated contact.

In an optional example embodiment, still by taking the terminal being a mobile phone as an example, when the mobile phone in a dormant state is triggered to wake up, the mobile phone detects a facial image of the current user by using a front camera and extract a characteristic of the facial image, to take the acquired facial characteristic of the current terminal user as the biometric characteristic of the current user. In another optional example embodiment, still by taking the current terminal being a mobile phone as an example, if the user unlocks the mobile phone in a dormant state by using a fingerprint, the mobile phone may detect fingerprint information of the current user and extract a fingerprint characteristic of the current user as the biometric characteristic of the current user.

In the foregoing solution, in consideration of an environmental influence on the detection, it may be determined that the biometric characteristic of the current terminal user matches the preset biometric characteristic if a degree of similarity between the biometric characteristic of the current terminal user and the preset biometric characteristic reaches a preset threshold. The foregoing step is mainly used for determining whether the current terminal user is a preset user by matching biometric characteristics. The preset user is a user having the highest permission to use the current terminal.

The display device 704 is configured to display the first information of the designated contact when the judgment result indicates that the biometric characteristic matches the preset biometric characteristic; or display second information of other contacts except the designated contact in the terminal when the judgment result indicates that the biometric characteristic does not match the preset biometric characteristic.

In the foregoing solution, the judgment result at least includes either of the following: matching and mismatching. If the biometric characteristic of the current terminal user matches the preset biometric characteristic, it is determined that the current terminal user is a preset user. In this case, the terminal displays the first information of the designated contact. If the biometric characteristic of the current terminal user does not match the preset biometric characteristic, it is determined that the current terminal user is not the preset user. In this case, the terminal hides the first information of the designated contact.

It should be noted herein that, in the foregoing solution, for a designated contact, a judgment on a user of a current terminal is made by using a biometric recognition device of the terminal, such as a face recognition device, a fingerprint recognition device or an iris recognition device. Because biometric recognition is unique, accurate and fast, the terminal may accurately determine whether the current terminal user is a preset user having a preset biometric characteristic, and further determine whether to display related information of the designated contact. In this way, privacy of the terminal may be guaranteed to prevent privacy information of the user from being snooped by others, and further use convenience for the user may be improved, thereby avoiding unnecessary repeated unlocking.

Thus, the foregoing solution solves the technical problems of inconvenience and poor privacy protection effects of an existing terminal caused by repeated unlocking.

Example Embodiment 6

Figure 8:
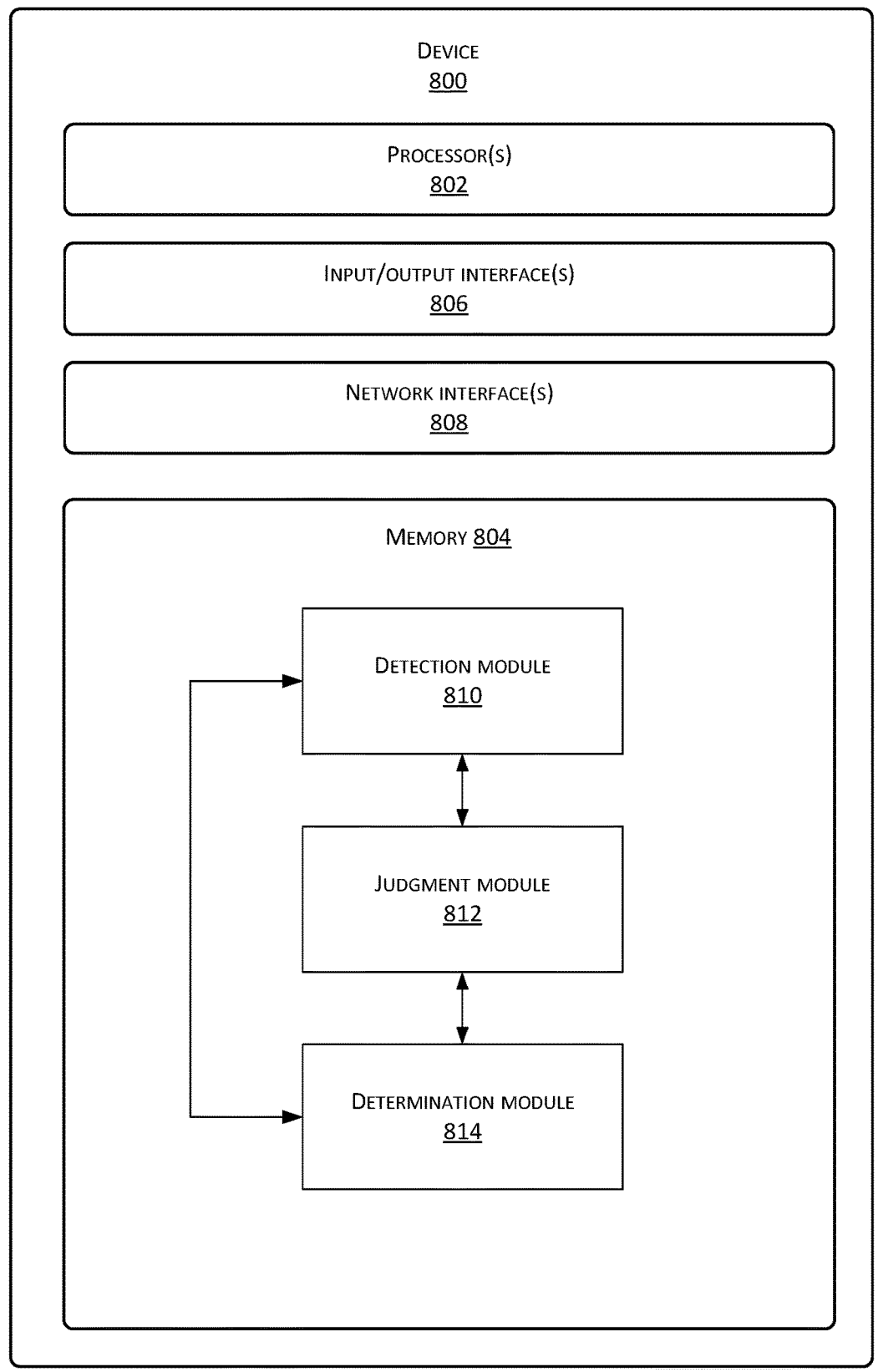
FIG. 8 is a schematic diagram of a contact information display device according to an example embodiment of the present disclosure.

This example embodiment further provides a contact information display device, applied to terminal equipment. The device is configured to implement the method shown in Example embodiment 1. As shown in FIG. 8, a device 800 includes one or more processor(s) 802 or data processing unit(s) and memory 804. The device 800 may further include one or more input/output interface(s) 806 and one or more network interface(s) 808. The memory 804 is an example of computer readable media.

The memory 804 may store therein a plurality of modules or units including:

a detection module 810 configured to detect a biometric characteristic of a current user of a terminal;

a judgment module 812 configured to determine whether the biometric characteristic matches a preset biometric characteristic; and a determination module 814 configured to determine, based on a judgment result, whether to display first information of a designated contact in the terminal.

It should be noted that, the foregoing modules may be implemented by software or hardware. The latter may be embodied in, but not limited to, the following implementation form: the modules are located in a same processor, or the modules are combined arbitrarily and located in different processors.

It should be noted that, reference may be made to the related descriptions in Example embodiments 1 and 3 for implementations of this example embodiment, and details are not described herein again.

Example Embodiment 7

Figure 9:
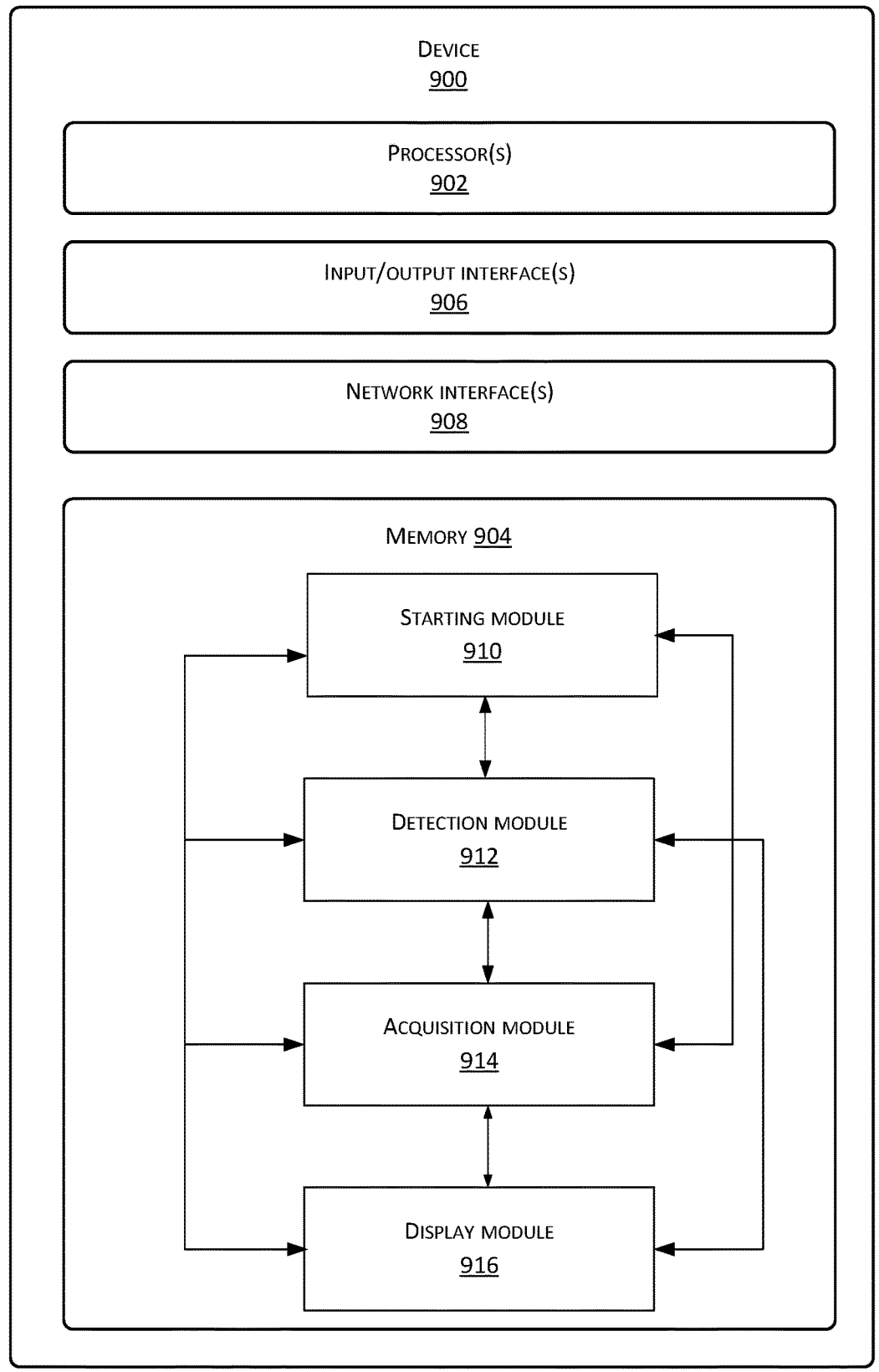
FIG. 9 is a schematic diagram of an information display device according to an example embodiment of the present disclosure.

This example embodiment further provides an information display device, applied to terminal equipment. The device is configured to implement the method shown in Example embodiment 2. As shown in FIG. 9, a device 900 includes one or more processor(s) 902 or data processing unit(s) and memory 904. The device 900 may further include one or more input/output interface(s) 906 and one or more network interface(s) 908. The memory 904 is an example of computer readable media.

The memory 904 may store therein a plurality of modules or units including:

a starting module 910 configured to start an APP on a terminal;

a detection module 912 configured to detect a biometric characteristic of a current user;

an acquisition module 914 configured to acquire an access permission corresponding to the biometric characteristic; and a display module 916 configured to display, according to the access permission, content which is displayed by the APP and corresponds to the access permission.

It should be noted that, the foregoing modules may be implemented by software or hardware. The latter may be embodied as, but not limited to, the following implementation form: the modules are located in a same processor, or the modules are combined arbitrarily and located in different processors.

It should be noted that, reference may be made to the related descriptions in Example embodiments 2 and 3 for implementations of this example embodiment, and details are not described herein again.

Example Embodiment 8

The example embodiment of the present disclosure provides a mobile terminal. The mobile terminal may be any mobile terminal equipment in a mobile terminal group.

Optionally, in this example embodiment, the computer terminal may be at least one of multiple network devices located in a computer network.

In this example embodiment, the computer terminal may execute program code of the following steps: detecting a biometric characteristic of a current user of the terminal; determining whether the biometric characteristic matches a preset biometric characteristic; and determining, based on a judgment result, whether to display first information of a designated contact in the terminal.

Figure 10:
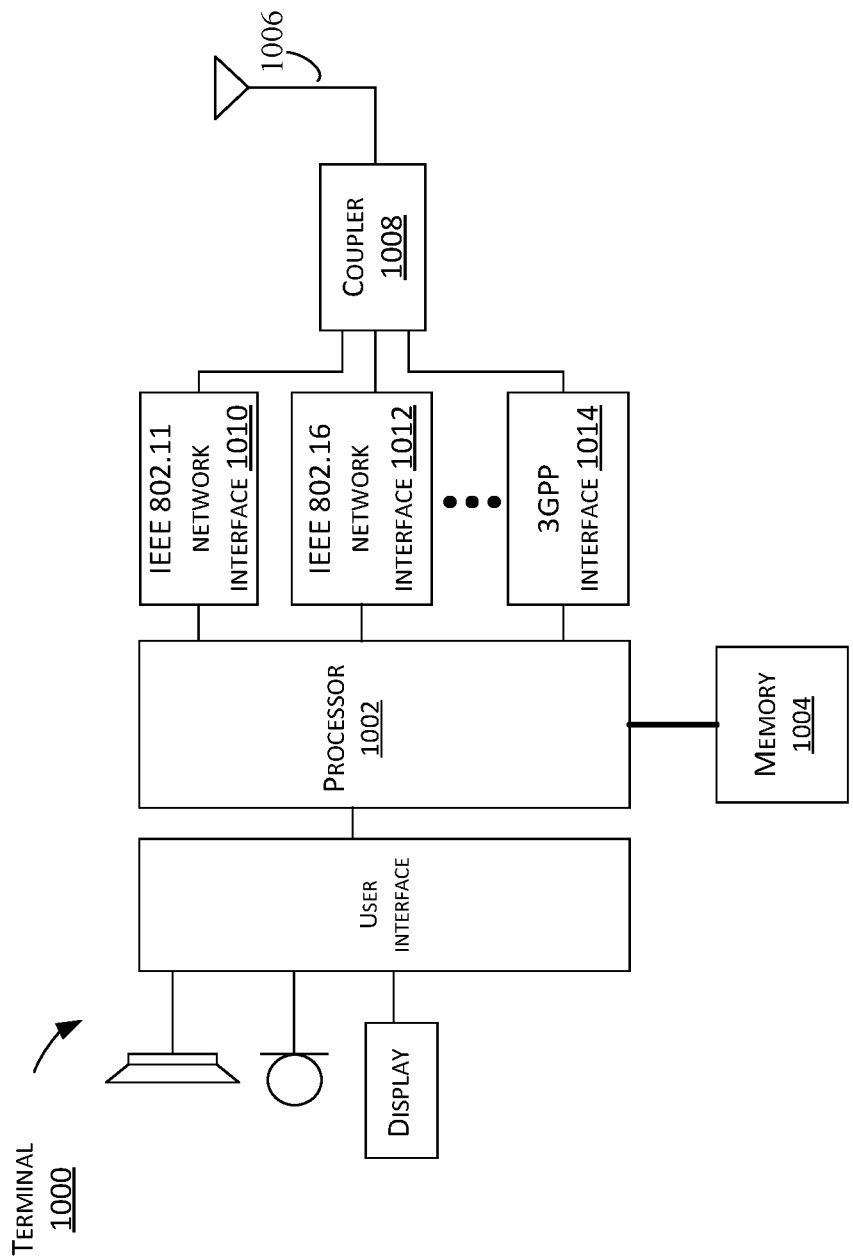
FIG. 10 is a structural diagram of a mobile terminal according to an example embodiment of the present disclosure.

Optionally, FIG. 10 is a structural diagram of a mobile terminal according to an example embodiment of the present disclosure. As shown in FIG. 10, a terminal 1000 may include: one or more (only one is shown in the figure) processors 1002, a memory 1004 and a transmission device 1006.

The memory may be configured to store software programs and modules, for example, program instructions/modules corresponding to the method and device in the example embodiments of the present disclosure. The processor runs the software programs and modules stored in the memory, to implement various functional applications and data processing, that is, implement the method for detecting an attack on a system vulnerability. The memory may include a high-speed RAM, and may also include a non-volatile memory, for example, one or more magnetic storage devices, flash memories or other nonvolatile solid-state memories. In some instances, the memory may further include memories remotely disposed relative to the processor, and these remote memories may be connected to the terminal 1000 via a network. Instances of the network include, but are not limited to, the Internet, an intranet, a local area network, a mobile communications network, or their combinations.

The processor may invoke information and APPs stored in the memory by using the transmission device, to perform the following steps: displaying the first information of the designated contact when the judgment result indicates that the biometric characteristic matches the preset biometric characteristic; or displaying second information of other contacts except the designated contact in the terminal when the judgment result indicates that the biometric characteristic does not match the preset biometric characteristic.

Optionally, the processor may further execute program code of the following step: invoking the first information of the designated contact from a first database when the judgment result indicates that the biometric characteristic matches the preset biometric characteristic, wherein the first database is different from a second database used for storing the second information of the other contacts.

Optionally, the processor may further execute program code of the following steps: undisguising the first information to obtain content identifiable to the terminal user; and displaying the identifiable content.

Optionally, the processor may further execute program code of the following steps: receiving third information of a current contact; and determining whether the third information is related to the designated contact, and taking the third information as the first information of the designated contact when the third information is related to the designated contact.

Optionally, the processor may further execute program code of the following step: determining whether the third information is related to the designated contact in one of the following manners: determining whether the third information includes identification information of the designated contact; and determining whether the current contact is identical with the designated contact.

Optionally, the first information is information displayed by an APP currently running in the terminal; and the processor may further execute program code of the following step: starting the APP of the terminal before detecting the biometric characteristic of the current user of the terminal.

It should be noted herein that, in the foregoing solution, for a designated contact, a judgment on a user of a current terminal is made by using a biometric recognition device of the terminal, such as a face recognition device, a fingerprint recognition device or an iris recognition device. Because biometric recognition is unique, accurate and fast, the terminal may accurately determine whether the current terminal user is a preset user having a preset biometric characteristic, and further determine whether to display related information of the designated contact. In this way, privacy of the terminal may be guaranteed to prevent privacy information of the user from being snooped by others, and further use convenience for the user may be improved, thereby avoiding unnecessary repeated unlocking.

Persons of ordinary skill in the art may understand that the structure shown in FIG. 10 is only for the purpose of illustration, and the mobile terminal may also be a terminal device such as a smart phone (e.g., an Android phone, an iOS phone, or the like), a tablet computer, a handheld computer, a Mobile Internet Device (MID), or a PAD. FIG. 10 does not limit the structure of the electronic device. For example, the terminal 1000 may also include more or fewer components (e.g., a network interface, a display device and so on) than those shown in FIG. 10, or have a configuration different from that shown in FIG. 10. For example, the processors 1002 may be coupled with the transmission device 1006 via a coupler 1008 based on various network interfaces such as an IEEE 802.11 network interface 1010, an IEEE 802.16 network interface 1012, . . . , 3GPP interface 1014. The processor 1002 may conduct input and output through a display 1016 via a user interface 1018.

Persons of ordinary skill in the art may understand that all or some of steps in the methods of the above example embodiments may be completed by a program instructing relevant hardware of the terminal device. The program may be stored in a computer readable storage medium. The storage medium may include: a flash disk, a ROM, a RAM, a magnetic disk, an optical disc or the like.

Example Embodiment 9

The example embodiment of the present disclosure further provides a storage medium. Optionally, in this example embodiment, the storage medium may be used for storing program code executed by the contact information display method provided in Example embodiment 1.

Optionally, in this example embodiment, the storage medium may be located in any mobile terminal of a mobile terminal group.

Optionally, in this example embodiment, the storage medium is configured to store program code for performing the following steps: detecting a biometric characteristic of a current user of a terminal; determining whether the biometric characteristic matches a preset biometric characteristic; and determining, based on a judgment result, whether to display first information of a designated contact in the terminal.

The sequence numbers of the foregoing example embodiments of the present disclosure are merely for the convenience of description, and do not imply the preference among the example embodiments.

In the foregoing example embodiments of the present disclosure, the description of each example embodiment has its own focus. For content that is not detailed in a certain example embodiment, reference may be made to the relevant description of another example embodiment.

In the several example embodiments provided in the present disclosure, it should be understood that the disclosed technical content may be implemented in other manners. The apparatus example embodiments described above are only exemplary. For example, division of the unit is merely division based on logical functions and there may be other division manners in the actual implementation. For example, a plurality of units or components may be combined or integrated into another system, or some features may be ignored or not performed. In addition, the mutual coupling or direct coupling or communication connections displayed or discussed may be implemented by using some interfaces, and the indirect coupling or communication connections between the units or modules may be implemented electrically or in another form.

The units described as separate parts may be or may not be physically separate. Parts displayed as units may be or may not be physical units, and may be located in one position or distributed on a plurality of network units. Some or all of the units may be selected according to actual needs to achieve the objectives of the solutions of the example embodiments.

In addition, functional units in the example embodiments of the present disclosure may be integrated into one processing unit, or each of the units may exist alone physically, or two or more units may be integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer readable storage medium. Based on such understanding, the technical solutions of the present disclosure essentially, or the part that makes contributions to the prior art, or all or a part of the technical solutions may be implemented in the form of a software product. The computer software product is stored in a storage medium, and includes several instructions for instructing a computer device (which may be a personal computer, a server, a network device or the like) to perform all or a part of the steps of the methods described in the example embodiments of the present disclosure. The foregoing storage medium includes: any medium that may store program code, such as a USB flash drive, a ROM, a RAM, a removable hard disk, a magnetic disk, or an optical disc.

The foregoing are only example embodiments of the present disclosure. It should be noted by persons of ordinary skill in the art that several improvements and modifications may be made without departing from the principle of the present disclosure, and these improvements and modifications should also be construed as the protection scope of the present disclosure.

The present disclosure may further be understood with clauses as follows.

Clause 1. A contact information display method comprising:

detecting a biometric characteristic of a current user of a terminal;

determining whether the biometric characteristic matches a preset biometric characteristic; and determining, based on a judgment result, whether to display first information of a designated contact in the terminal.

Clause 2. The method of clause 1, wherein the step of determining, based on a judgment result, whether to display first information of a designated contact in the terminal comprises:

displaying the first information of the designated contact when the judgment result indicates that the biometric characteristic matches the preset biometric characteristic; or displaying second information of other contacts except the designated contact in the terminal when the judgment result indicates that the biometric characteristic does not match the preset biometric characteristic.

Clause 3. The method of clause 2, wherein the step of displaying the first information of the designated contact when the judgment result indicates that the biometric characteristic matches the preset biometric characteristic comprises:

invoking the first information of the designated contact from a first database when the judgment result indicates that the biometric characteristic matches the preset biometric characteristic, wherein the first database is different from a second database used for storing the second information of the other contacts.

Clause 4. The method of clause 2, wherein the step of displaying the first information of the designated contact comprises:

undisguising the first information to obtain content identifiable to the user of the terminal; and displaying the identifiable content.

Clause 5. The method of clause 1, wherein the method further comprises: acquiring the first information in the following manner:

receiving third information of a current contact; and
determining whether the third information is related to the designated contact, and taking the third information as the first information of the designated contact when the third information is related to the designated contact.

Clause 6. The method of clause 5, wherein whether the third information is related to the designated contact is determined in one of the following manners: determining whether the third information comprises identification information of the designated contact; and determining whether the current contact is identical with the designated contact.

Clause 7. The method of any of clauses 1 to 6, wherein
the first information is information displayed by an application which is currently running in the terminal; and
before the step of detecting a biometric characteristic of a current user of a terminal, the method further comprises: starting the application of the terminal.

Clause 8. An information display method comprising:
starting an application on a terminal;
detecting a biometric characteristic of a current user;
acquiring an access permission corresponding to the biometric characteristic; and
displaying, based on the access permission, content which is displayed by the application and corresponds to the access permission.

Clause 9. A terminal comprising:
a processor configured to detect a biometric characteristic of a current user of the terminal; determine whether the biometric characteristic matches a preset biometric characteristic; and determine, based on a judgment result, whether to display first information of a designated contact; and
a display device configured to display the first information of the designated contact when the judgment result indicates that the biometric characteristic matches the preset biometric characteristic; or display second information of other contacts except the designated contact in the terminal when the judgment result indicates that the biometric characteristic does not match the preset biometric characteristic.

Clause 10. A contact information display device comprising:
a detection module configured to detect a biometric characteristic of a current user of a terminal;
a judgment module configured to determine whether the biometric characteristic matches a preset biometric characteristic; and
a determination module configured to determine, based on a judgment result, whether to display first information of a designated contact in the terminal.

Clause 11. An information display device comprising:
a starting module configured to start an application on a terminal;
a detection module configured to detect a biometric characteristic of a current user;
an acquisition module configured to acquire an access permission corresponding to the biometric characteristic; and
a display module configured to display, based on the access permission, content which is displayed by the application and corresponds to the access permission.

Clause 12. A terminal comprising:
one or more processors; and
one or more memories storing thereon computer-readable instructions that, when executed by the one or more processors, cause the one or more processors to perform second acts comprising:
detecting biometric characteristic of a first user of the terminal;
determining whether the biometric characteristic match a preset biometric characteristic; and
disguising first information received from a designated contact that is displayed at a user interface of the terminal so that the first information is not identified as sent by the designated contact at the user interface, in response to determining that the biometric characteristic does not match the preset biometric characteristic.

Clause 13. The terminal of clause 12, wherein the biometric characteristic includes:
a face characteristic;
a fingerprint characteristic; or
an iris characteristic.

Clause 14. The terminal of clause 12, wherein the disguising the notification message of first information includes not presenting the notification message of the first information.

Clause 15. The terminal of clause 12, wherein the disguising the notification message of first information includes displaying second information of another contacts that is not the designated contact at the user interface.

Clause 16. The terminal of clause 12, further comprising:
detecting biometric characteristic of a second user of the terminal;
determining that the biometric characteristic matches the preset biometric characteristic;
undisguising the first information to obtain an identifiable content; and
displaying the identifiable content at the user interface.

Clause 17. A method comprising:
receiving a biometric characteristic of a current user of a terminal;
determining whether the biometric characteristic matches a preset biometric characteristic; and
determining to display first information of a designated contact at the terminal in response to determining that the biometric characteristic matches the preset biometric characteristic.

Clause 18. The method of clause 17, further comprising detecting the biometric characteristic of the current user of the terminal.

Clause 19. The method of clause 17, wherein the biometric characteristic includes:
a face characteristic;
a fingerprint characteristic; or
an iris characteristic.

Clause 20. The method of clause 17, further comprising displaying the first information of the designated contact at the terminal.

Clause 21. The method of clause 20, wherein the displaying the first information of the designated contact at the terminal includes:
retrieving the first information of the designated contact from a first database.

Clause 22. The method of clause 21, wherein the first database is different from a second database that stores second information of other contacts.

Clause 23. The method of clause 20, wherein the displaying the first information of the designated contact includes:
undisguising the first information to obtain an identifiable content; and
displaying the identifiable content.

Clause 24. The method of clause 17, further comprising:
receiving third information of a contact; and
determining that the third information is related to the designated contact; and
the third information as the first information of the designated contact when the third information is related to the designated contact.

Clause 25. The method of clause 24, wherein the determining that the third information is related to the designated contact includes:
determining that the third information includes identity information of the designated contact; and
determining that the contact is identical with the designated contact.

Clause 26. The method of clause 12, wherein:
the first information is information displayed by an application which is currently running in the terminal.

Clause 27. The method of clause 26, further comprising:
before the receiving the biometric characteristic of the current user of the terminal, starting the application in the terminal.

Clause 28. One or more memories storing thereon computer-readable instructions that, when executed by one or more processors, cause the one or more processors to perform second acts comprising:
storing a first content related to a first contact at a first database and a second content related to a second contact at a second database, the first database being distinct from the second database;
detecting a biometric characteristic of a current user;
acquiring an access permission, corresponding to the biometric characteristic, that determines a contact that the current user has access permission; and
displaying, based on the access permission, a content corresponds to the access permission.

Clause 29. The one or more memories of clause 28, wherein the biometric characteristic includes a face characteristic.

Clause 30. The one or more memories of clause 28, wherein the biometric characteristic includes a fingerprint characteristic.

Clause 31. The one or more memories of clause 28, wherein the biometric characteristic includes an iris characteristic.

What is claimed is:

1. A terminal comprising:
one or more processors; and
one or more memories storing thereon computer-readable instructions that, when executed by the one or more processors, cause the one or more processors to perform acts comprising:
detecting a biometric characteristic of a first user of the terminal;
determining whether the biometric characteristic matches a preset biometric characteristic;
in response to determining that the biometric characteristic does not match the preset biometric characteristic, disguising first information to be displayed at a user interface of the terminal as different information irrelevant to the first information, the first information being received from a designated contact;
detecting a biometric characteristic of a second user of the terminal;
determining that the biometric characteristic of the second user matches the preset biometric characteristic;
undisguising the first information to obtain an identifiable content; and
displaying the identifiable content at the user interface, wherein the biometric characteristic includes:
a face characteristic;
a fingerprint characteristic; or
an iris characteristic.

2. The terminal of claim 1, wherein disguising the first information includes refraining from presenting a notification message of the first information.

3. The terminal of claim 1, wherein disguising the first information includes displaying second information of another contacts that is not the designated contact at the user interface.

4. A method comprising:
receiving a biometric characteristic of a current user of a terminal;
determining whether the biometric characteristic matches a preset biometric characteristic;
in response to determining that the biometric characteristic does not match the preset biometric characteristic;
disguising first information of a designated contact as different information irrelevant to the first information;
determining to display the first information as the different information at the terminal;
receiving another biometric characteristic of the current user;
in response to determining that the another biometric characteristic matches the preset biometric characteristic, undisguising the different information to obtain an identifiable content; and
displaying the identifiable content, wherein the biometric characteristic includes:
a face characteristic;
a fingerprint characteristic; or
an iris characteristic.

5. The method of claim 4, further comprising detecting the biometric characteristic of the current user of the terminal.

6. The method of claim 4, wherein the preset biometric characteristic is stored at the terminal or a remote database.

7. The method of claim 4, further comprising displaying the first information as the different information at the terminal.

8. The method of claim 7, wherein displaying the first information as the different information at the terminal includes:
retrieving the first information from a first database.

9. The method of claim 8, wherein the first database is different from a second database that stores second information of other contacts.

10. The method of claim 4, further comprising:
receiving third information of a contact; and
determining that the third information is related to the designated contact; and
determining the third information as the first information of the designated contact when the third information is related to the designated contact.

11. The method of claim 10, wherein determining that the third information is related to the designated contact includes:
determining that the third information includes identity information of the designated contact; and
determining that the contact is identical with the designated contact.

12. The method of claim 4, wherein:
the different information is information displayed by an application which is currently running in the terminal.

13. The method of claim 12, further comprising:
before receiving the biometric characteristic of the current user of the terminal, starting the application in the terminal.

14. One or more memories storing thereon computer-readable instructions that, when executed by one or more processors, cause the one or more processors to perform acts comprising:
detecting a biometric characteristic of a current user;
acquiring an access permission, corresponding to the biometric characteristic, that determines a contact that the current user has access permission; and
displaying, based on the access permission, a content of the contact corresponding to the access permission including:
displaying the content disguised as different information irrelevant to the content, and
undisguising the different information to obtain an identifiable content,
wherein the biometric characteristic includes:
a face characteristic;
a fingerprint characteristic; or
an iris characteristic.

15. The one or more memories of claim 14, wherein the acts further comprise storing a first content related to a first contact at a first database and a second content related to a second contact at a second database, the first database being distinct from the second database.

16. The one or more memories of claim 14, wherein displaying the content corresponding to the access permission disguised as the different information includes launching an application to display the content.

* * * * *